United States Patent
Sudak

(10) Patent No.: US 9,107,027 B2
(45) Date of Patent: Aug. 11, 2015

(54) WIRELESS CONNECTOR

(71) Applicant: Intel Corporation, Santa Clara, CA (US)

(72) Inventor: Eran Sudak, Herzliya (IL)

(73) Assignee: INTEL CORPORATION, Santa Clara, CA (US)

( * ) Notice: Subject to any disclaimer, the term of this patent is extended or adjusted under 35 U.S.C. 154(b) by 166 days.

(21) Appl. No.: 13/693,639

(22) Filed: Dec. 4, 2012

(65) Prior Publication Data

US 2014/0055945 A1    Feb. 27, 2014

Related U.S. Application Data

(60) Provisional application No. 61/692,264, filed on Aug. 23, 2012, provisional application No. 61/692,269, filed on Aug. 23, 2012.

(51) Int. Cl.
| | |
|---|---|
| *G06F 1/16* | (2006.01) |
| *H04W 4/00* | (2009.01) |
| *H02G 3/02* | (2006.01) |

(52) U.S. Cl.
CPC .............. *H04W 4/008* (2013.01); *G06F 1/1632* (2013.01); *G06F 1/1656* (2013.01); *G06F 1/1698* (2013.01); *H02G 3/02* (2013.01)

(58) Field of Classification Search
CPC .................................................... G06F 1/1632
USPC ........................................ 361/679.43, 679.45
See application file for complete search history.

(56) References Cited

U.S. PATENT DOCUMENTS

| | | | |
|---|---|---|---|
| 5,864,708 A * | 1/1999 | Croft et al. ........................ | 710/1 |
| 7,013,163 B2 | 3/2006 | Jaggers et al. | |
| 7,878,863 B2 * | 2/2011 | Johansson et al. ............ | 439/668 |
| 8,090,890 B2 | 1/2012 | Rofougaran | |
| 8,275,373 B2 * | 9/2012 | Julian et al. .................... | 455/434 |
| 8,553,408 B2 * | 10/2013 | Supran et al. ............ | 361/679.41 |
| 8,660,492 B2 * | 2/2014 | Hong et al. .................. | 455/41.2 |
| 8,688,037 B2 * | 4/2014 | Chatterjee et al. ........... | 455/41.1 |
| 8,842,429 B2 * | 9/2014 | Ahn et al. ................ | 361/679.41 |
| 2003/0002243 A1 | 1/2003 | Newman et al. | |
| 2004/0110472 A1 | 6/2004 | Witkowski et al. | |
| 2005/0246470 A1 * | 11/2005 | Brenner ........................ | 710/303 |
| 2005/0288058 A1 | 12/2005 | Chandhok et al. | |
| 2006/0212637 A1 | 9/2006 | Lo et al. | |
| 2007/0254695 A1 | 11/2007 | Langberg et al. | |
| 2008/0278894 A1 | 11/2008 | Chen et al. | |
| 2008/0278899 A1 * | 11/2008 | Hotelling et al. ............. | 361/683 |

(Continued)

OTHER PUBLICATIONS

International Search Report and Written Opinion for PCT Application No. PCT/US2013/048053, mailed on Oct. 18, 2013, 16 pages.

(Continued)

*Primary Examiner* — Anthony Q Edwards
(74) *Attorney, Agent, or Firm* — Shichrur & Co.

(57) ABSTRACT

Some demonstrative embodiments include a wireless connector and devices and/or systems utilizing one or more wireless connectors. For example, a device may include a wireless connector to be coupled to another device for communicating data with the other device, the wireless connector including a wireless communication unit to communicate the data over a wireless communication link, for example, a short-range wireless communication link, e.g. at a multi-gigabit-per second (MGbs) rate.

20 Claims, 4 Drawing Sheets

(56) References Cited

U.S. PATENT DOCUMENTS

| | | | |
|---|---|---|---|
| 2008/0318524 A1* | 12/2008 | Rofougaran | 455/41.1 |
| 2010/0081377 A1* | 4/2010 | Chatterjee et al. | 455/41.1 |
| 2010/0146308 A1* | 6/2010 | Gioscia et al. | 713/300 |
| 2010/0203833 A1* | 8/2010 | Dorsey | 455/41.2 |
| 2010/0250818 A1* | 9/2010 | Gill et al. | 710/304 |
| 2011/0171903 A1 | 7/2011 | Toebes | |
| 2011/0248665 A1* | 10/2011 | Smith et al. | 320/101 |
| 2012/0023171 A1 | 1/2012 | Redmond | |
| 2012/0115414 A1 | 5/2012 | Fadell et al. | |
| 2012/0190406 A1 | 7/2012 | Chen | |
| 2012/0206090 A1* | 8/2012 | Hyun-Jun et al. | 320/107 |
| 2012/0265913 A1 | 10/2012 | Suumaki et al. | |
| 2012/0282858 A1* | 11/2012 | Gill et al. | 455/41.1 |
| 2013/0145050 A1 | 6/2013 | Huang et al. | |
| 2013/0173315 A1* | 7/2013 | Dorsey | 705/5 |
| 2013/0194729 A1 | 8/2013 | Joe et al. | |
| 2013/0202427 A1 | 8/2013 | Macelroy | |
| 2013/0252548 A1* | 9/2013 | Levy et al. | 455/41.2 |
| 2013/0297844 A1* | 11/2013 | Rosenberg et al. | 710/303 |
| 2013/0343247 A1* | 12/2013 | Kasher | 370/311 |
| 2013/0346661 A1* | 12/2013 | Hasenei | 710/303 |
| 2014/0030985 A1* | 1/2014 | Cordeiro | 455/74 |
| 2014/0053871 A1* | 2/2014 | Ma et al. | 134/6 |
| 2014/0059263 A1 | 2/2014 | Rosenberg et al. | |
| 2014/0059264 A1* | 2/2014 | Sudak | 710/303 |
| 2014/0211801 A1* | 7/2014 | Trainin et al. | 370/392 |
| 2014/0247548 A1* | 9/2014 | Sharma et al. | 361/679.27 |

OTHER PUBLICATIONS

Wireless Gigabit Alliance (WGA) Specifications; WiGig MAC and PHY Specification Version 1.0, Apr. 2010—Final Specification; 311 pages.

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

U.S. Appl. No. 13/693,687, filed Dec. 4, 2012, 30 pages.

International Search Report and Written Opinion for PCT/US2013/048055, mailed on Sep. 27, 2013; 13 pages.

International Preliminary Report on Patentability for International Patent Application No. PCT/US2013/048055, mailed on Mar. 5, 2015, 9 pages.

Office Action for U.S. Appl. No. 13/693,687, mailed on Dec. 23, 2014, 14 pages.

International Preliminary Report on Patentability for International Patent Application No. PCT/US2013/048053, mailed on Mar. 5, 2015, 10 pages.

Office Action for U.S. Appl. No. 13/693,687 mailed on Jun. 8, 2015, 18 pages.

\* cited by examiner

US 9,107,027 B2

WIRELESS CONNECTOR

CROSS REFERENCE

This application claims the benefit of and priority from U.S. Provisional Patent application No. 61/692,264 entitled "Wireless connector", filed Aug. 23, 2012, and U.S. Provisional Patent application No. 61/692,269 entitled "Docking device including wireless connector", filed Aug. 23, 2012 the entire disclosures of both Applications are incorporated herein by reference.

BACKGROUND

Conventional mobile devices, e.g., small mobile devices, such as Smartphones and tablets, all use some form of mechanical connectors to allow for fast data connectivity to the mobile device, e.g., for downloading pictures from a camera, burning firmware, backing up information stored on the device, and the like. For example, the mechanical connectors may include a Universal Serial Bus (USB) connector, a micro USB connector, a pin connector, and the like.

The conventional mechanical connectors may be configured according to a mechanical mating scheme. For example, a conventional mobile device may typically include a connector socket configured to mate with a connector plug.

In some implementations, the mobile device may be connected to another device via a cable, which may include a first connector plug to be connected to the connector socket of the mobile device and a second connector plug to be connected to a connector socket of the other device. For example, a Smartphone may be connected to a desktop computer via the cable.

In other implementations, the plug connector may be formed as part of the other device. For example, a cradle of a tablet computer may include a connector plug to be connected to the connector socket of the tablet computer.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
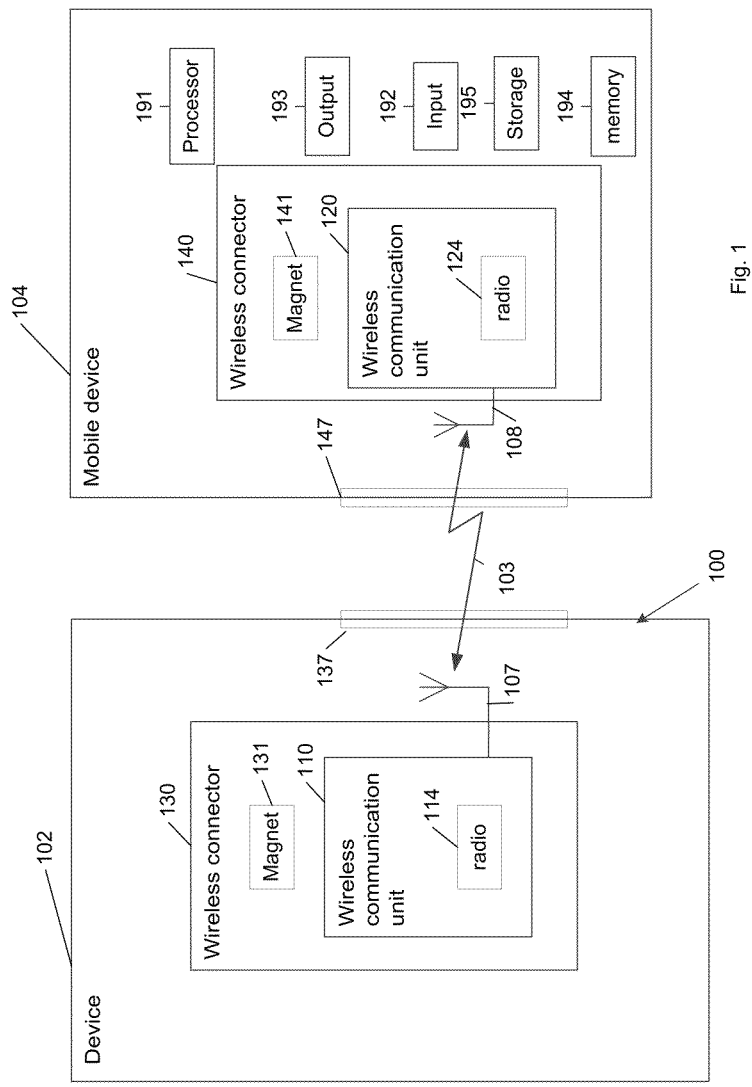
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication device, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (*Wireless Gigabit Alliance, Inc WiGig MAC and PHY Specification Version* 1.0, April 2010, *Final specification*) and/or future versions and/or derivatives thereof, devices and/ or networks operating in accordance with existing WiGig Serial Extension (WSE) protocols (*WiGig Serial Extension (WSE) Specification Draft* 1.02, August 2012) and/or future versions and/or derivatives thereof, devices and/or networks operating in accordance with existing WiGig Display Extension (WDE) protocols (*WDE Draft Specification* 1.04, August 2012) and/or future versions and/or derivatives thereof, devices and/or networks operating in accordance with existing Bulk Only Transfer (BOT) Protocols ("the BOT protocol") (*Universal Serial Bus (USB) Mass Storage Class Bulk-Only Transport*, Revision 1.0, Sep. 31, 1999) and/or future versions and/or derivatives thereof, devices and/or networks operating in accordance with existing WiGig Bus Extension (WBE) protocols (*WiGig Bus Extension Spec (WBE)*, Version 1.0 Jun. 2011) and/or future versions and/or derivatives thereof, devices and/or networks operating in accordance with existing WiGig Secure Digital (SD) Extension (WSD) protocols (*WiGig SD Extension (WSD) PAL Specification Draft* 1.0 August 2012) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2102; IEEE802.11 task group ac (TGac) ("*IEEE802.11-09/0308r12—TGac Channel Model Addendum Document*"); IEEE 802.11 task group ad (TGad) (*IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The phrase "short range wireless communication link" as used herein may relate to a wireless communication link configured to communicate over a range of up to 10 centimeters (cm), e.g., a range of no more than 5 cm. In one example, the short-range wireless communication link may have a range of less than 3 cm, for example, a range of up to two centimeters, e.g., a range of up to one centimeter.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some conventional mobile devices, e.g., small mobile devices, such as Smartphones and tablets, all use some form of mechanical connectors and cables to allow for fast data connectivity to the mobile device.

The conventional mechanical connectors may be configured according to a mechanical mating scheme. For example, the conventional mobile device may typically include a connector socket configured to mate with a connector plug.

Despite having a variety of form factors, these mechanical connectors have common disadvantages.

For example, a cavity created in the body of the mobile device by the connector socket may interfere with the clean lines of a particular industrial design.

Additionally, the mobile device cannot be connected to the connector plug when the mobile device is covered by a case, e.g., unless the case has an aperture cut through. Such aperture may interfere with the industrial design of the mobile device.

Additionally, as the mechanical coupling that is created between the plug connector of a connector cable and the socket is typically quite strong, the mobile device, connectors and/or cable may be damaged, for example, in cases of accidental yanks of the cable, e.g., by tripping over it.

Additionally, repeated plug/unplug events weaken the socket and the plug and cause abrasion.

Additionally, mechanical sockets are typically prone to improper plugging, e.g., upside down, unaligned etc., which may lead to mechanical damage and/or frustration.

Additionally, the cavity created by the connector socket is susceptible to dust, pocket lint, moisture or damage by foreign objects, e.g., coins or other objects in a pocket.

Additionally, the conventional connector sockets for conveying high-speed traffic occupy quite a significant volume inside the body of the mobile device. For example, a typical micro USB 3.0 socket and micro HDMI socket may occupy an area of about 113 square millimeters ($mm^2$) on a printed circuit board (PCB) of the mobile device, and a volume of about 265 cubic millimeters ($mm^3$).

Despite being prevalent in today's mobile devices, wireless communication technologies were not able to entirely replace cables. The typical applications of wireless technologies in mobile platforms are WWAN, WLAN and WPAN. While very convenient to use, these technologies usually do not offer the performance, the security and/or the ability to work in dense environment at the same level as cable connectors.

Some demonstrative embodiments include a wireless connector scheme to connect a mobile device to another device, which may include a mobile or non-mobile device, e.g., a cable, a cradle, and the like.

In some demonstrative embodiments, the wireless connector scheme may be configured to connect the mobile device to the other device, for example, without utilizing a mechanical mating scheme.

In some demonstrative embodiments, the wireless connector scheme may be utilized for connecting and/or interfacing between the devices.

In some demonstrative embodiments, the wireless connector scheme may be configured to connect between the mobile device and the other device without affecting an external surface and/or housing of the mobile device.

Reference is now made to FIG. 1, which schematically illustrates a block diagram of a system 100, in accordance with some demonstrative embodiments.

In some demonstrative embodiments, system 100 may include a wireless connector scheme to connect between a device 104 and another device 102.

In some demonstrative embodiments, device 104 may include, or may be included as part of a mobile or portable device, for example, a mobile computer, a laptop computer, a notebook computer, a tablet computer, a Smartphone, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a television, a music player, or the like.

Wireless communication device 104 may also include, for example, one or more of a processor 191, an input unit 192, an output unit 193, a memory unit 194, and a storage unit 195. Wireless communication device 102 may optionally include other suitable hardware components and/or software components. In some demonstrative embodiments, some or all of the components of one or more of wireless communication device 102, may be enclosed in a common housing or packaging, and may be interconnected or operably associated using one or more wired or wireless links. In other embodiments, components of one or more of wireless communication device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication device 102 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication device 102.

In some demonstrative embodiments, device 102 may include a wireless connector 130, and device 104 may include a wireless connector 140. Wireless connectors 130 and 140 may be configured to connect between devices 104 and 102, e.g., as described below.

In some demonstrative embodiments, wireless connectors 130 and/or 140 may include a wireless communication unit capable of communicating content, data, information and/or signals over at least one wireless communication link 103. For example, wireless connector 130 may include a wireless communication unit 110 and wireless connector 140 may include a wireless communication unit 120.

In some demonstrative embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, wireless communication units 110 and/or 120 may include, for example, one or more radios, e.g., a radio 114 and/or a radio 124, including one or more wireless transmitters, receivers and/or transceivers able to send and/or receive wireless communication signals, RF signals, frames, blocks, transmission streams, packets, messages, data items, and/or data.

In some demonstrative embodiments, wireless connector 140 may be housed within a housing of device 104, and/or wireless connector 130 may be housed within a housing of device 102.

In some demonstrative embodiments, wireless connectors 130 and/or 140 may be formed on dedicated Integrated Chips (ICs). For example, wireless connector 130 may be formed on an IC housed within device 102, and wireless connector 140 may be formed on an IC housed within mobile device 104.

In some demonstrative embodiments, wireless connectors 130 and/or 140 may include a plug-less connector, for example, a connector, which does not include mechanical mating elements, e.g., a plug, a socket, pins, and the like.

In some demonstrative embodiments, wireless connector 130 may be configured to be physically coupled to wireless connector 140. For example, device 102 may include a coupling surface 137 configured to be physically coupled to a coupling surface 147 of device 104. Coupling surface 137 may be part of a housing of device 102 and/or coupling surface 147 may be part of a housing of device 104.

For example, coupling surfaces 137 and 147 may be formed in a shape, which may enable to physically couple coupling surfaces 137 and 147. For example, coupling surface 137 may include, or may be part of a flat outer surface of a housing of device 102, and/or coupling surface 147 may include, or may be part of, a flat outer surface of a housing of device 104, which may be fitted to coupling surface 137.

In some demonstrative embodiments, wireless connectors 130 and 140 may be configured to enable positioning of wireless communication unit 110 in close proximity to wireless communication unit 120. For example, wireless connector 130 may be positioned at close proximity to coupling surface 137 and wireless connector 140 may be positioned at close proximity to coupling surface 147.

In some demonstrative embodiments, devices 102 and 104 may utilize a magnetic force to physically couple and maintain wireless connectors 130 and 140 at close proximity. For example, wireless connectors 130 and 140 may include one or more magnetic elements configured to enable coupling of wireless connectors 130 and 140 by magnetic force.

In one example, device 102 may include a magnetic element 131 and/or device 104 may include a magnetic element 141, configured to enable coupling of wireless connectors 130 and 140 by magnetic force. For example, magnetic elements 131 and 141 may include magnetic elements having opposite poles.

Alternatively, device 104 may not include magnetic element 141, and coupling surface 147 may be formed, at least in part, of a ferromagnetic material, e.g., iron, nickel, metal and/or the like, which may enable magnetic element 131 to physically couple wireless connector 130 to coupling surface 147 by magnetic force.

In other embodiments, devices 104 and 102 may utilize any other type of coupling mechanism.

In some demonstrative embodiments, wireless communication link 103 may include a short-range wireless communication link at a multi-gigabit-per-second (MGbs) rate. For example, wireless communication link 103 may include a Wireless-Gigabit (WiGig) link.

In some demonstrative embodiments, wireless communication unit 110 may communicate the data over a WiGig Serial Extension (WSE) to communicate data, e.g., files, between devices 102 and 104.

In some demonstrative embodiments, wireless communication unit 110 may communicate the data over a WiGig Display Extension (WDE), e.g., to communicate video and/or audio data between devices 102 and 104.

In some demonstrative embodiments, wireless communication units 110 and 120 may communicate the data over a WBE link, a WSD link and/or any other link.

In other embodiments, wireless communication unit 110 may utilize any other suitable wireless communication technology and/or protocol.

In some demonstrative embodiments, wireless communication units 110 and/or 120 may be configured to establish wireless communication link 103 having a very limited range, e.g., so as not to persist for more than a few centimeters (cm) around a coupling point of wireless connectors 130 and 140, for example, to avoid interference to surrounding wireless communication devices.

In some demonstrative embodiments, wireless communication link 103 may be configured to overcome a housing of device 102, and/or housing and/or an external case of mobile device 104.

In some demonstrative embodiments, wireless communication link 103 may have a range of no more than five centimeters. In one embodiment, wireless communication link 103 may have a range of less than three centimeters. In another embodiment, wireless communication link 103 may have a range of up to two centimeters. In yet another embodiment, wireless communication link 103 may have a range of up to one centimeter.

In some demonstrative embodiments, the limited range of wireless communication link 103 may enable a solution to a very robust dense environment. For example, the limited range of wireless communication link 103 may enable a relatively large number of wireless communication links to coexist in a common environment, e.g., without interfering with each other. In one example, the limited range of wireless communication link 103 may reduce a probability of wireless communication link 103 interfering with another wireless communication link, e.g., if the wireless communication links are not located within the limited range.

In some demonstrative embodiments, the limited range of wireless communication link 103 may provide a higher level of security, e.g., compared to conventional WPAN, WLAN and/or WWAN links. For example, neighboring devices may not be able to monitor the communication over wireless communication link 103, e.g., if not located within the limited range of wireless communication link 103.

In some demonstrative embodiments, wireless communication units 110 and 120 may utilize a relatively low transmission power to maintain the reduced range of wireless communication link 103.

In some demonstrative embodiments, wireless communication units 110 and 120 may utilize a transmission power, which is lesser than 15 decibel milliwatts (dBm), for communicating over link 103. For example, wireless communication units 110 and 120 may communicate over link 103 utilizing a transmission power of less than 10 dBM, e.g., less than 5 dBm. In one example, wireless communication units 110 and 120 may utilize a transmission power of between −5 dBM and 5 dBM, e.g., between −2 dBm and 2 dBm. For example, wireless communication units 110 and 120 may utilize a transmission power of 0 dBm for communicating over link 103.

In some demonstrative embodiments, the limited range of wireless communication link 103 may enable a reduced power consumption of devices 102 and/or 104, e.g., due to the low transmission power.

In some demonstrative embodiments, the wireless connector scheme described herein may provide a new kind of user experience of plug/unplug ("zero-force plug/unplug"). The zero-force plug/unplug may enhance user experience in the mundane task of connecting device 102 to mobile device 104.

In some demonstrative embodiments, the wireless connector scheme described herein may overcome at least some of the disadvantages of the conventional mechanical connectors.

For example, wireless connectors 130 and/or 140 may allow for cleaner industrial design lines in both devices 102 and 104, allowing for Industrial-Design innovation ("Connector-less").

Additionally or alternatively, wireless connectors 130 and/or 140 may be designed to work through an external case of mobile device 104, thereby eliminating the need for any dedicated apertures in the case.

Additionally or alternatively, wireless connectors 130 and/or 140 may use magnetic coupling to attach wireless connector 130 to device 104 to provide sufficiently strong coupling, e.g., to withstand normal device manipulation, while enabling quick disengagement, e.g., in case of strong, immediate pull—thus reducing the risk of damage to the device or a person in case of accidental yank.

Additionally or alternatively, wireless connectors 130 and/or 140 may be completely robust to repeated plug/unplug events and may not suffer from abrasion, e.g., due to the "zero-force plug/unplug" mechanism.

Additionally or alternatively, wireless connectors 130 and/or 140 may not be prone to improper plugging.

Additionally or alternatively, wireless connectors 130 and/or 140 may eliminate the need of a cavity or socket in devices 102 and/or 104, which may attract dirt, moisture or get clogged by foreign objects.

Additionally or alternatively, wireless connectors 130 and/or 140 may be designed to yield a lower volumetric solution versus the conventional mechanical socket, while still allowing a similar amount and/or rate of data transfer.

In some demonstrative embodiments, wireless connectors 130 and/or 140 may yield higher security and better robustness in dense environments, e.g., compared to conventional WPAN wireless solutions, while still delivering the performance of a cabled solution.

In addition, due to the short range of wireless communication link 103, wireless communication link 103 may be very stable and less sensitive to environmental changes, thus providing a robust wireless connection.

In some demonstrative embodiments, device 102 may include or may be part of a connector cable, which may be configured to connect, for example, between device 104 and another device, e.g., as described below with reference to FIG. 2 and/or FIG. 3.

In some demonstrative embodiments, device 102 may include or may be part of a cradle for mobile device 104. For example, device 102 may include a cradle for device 104, e.g., a cradle for a Smartphone, a cradle for a Tablet computer, and the like, e.g., as described below with reference to FIG. 4.

Figure 2:
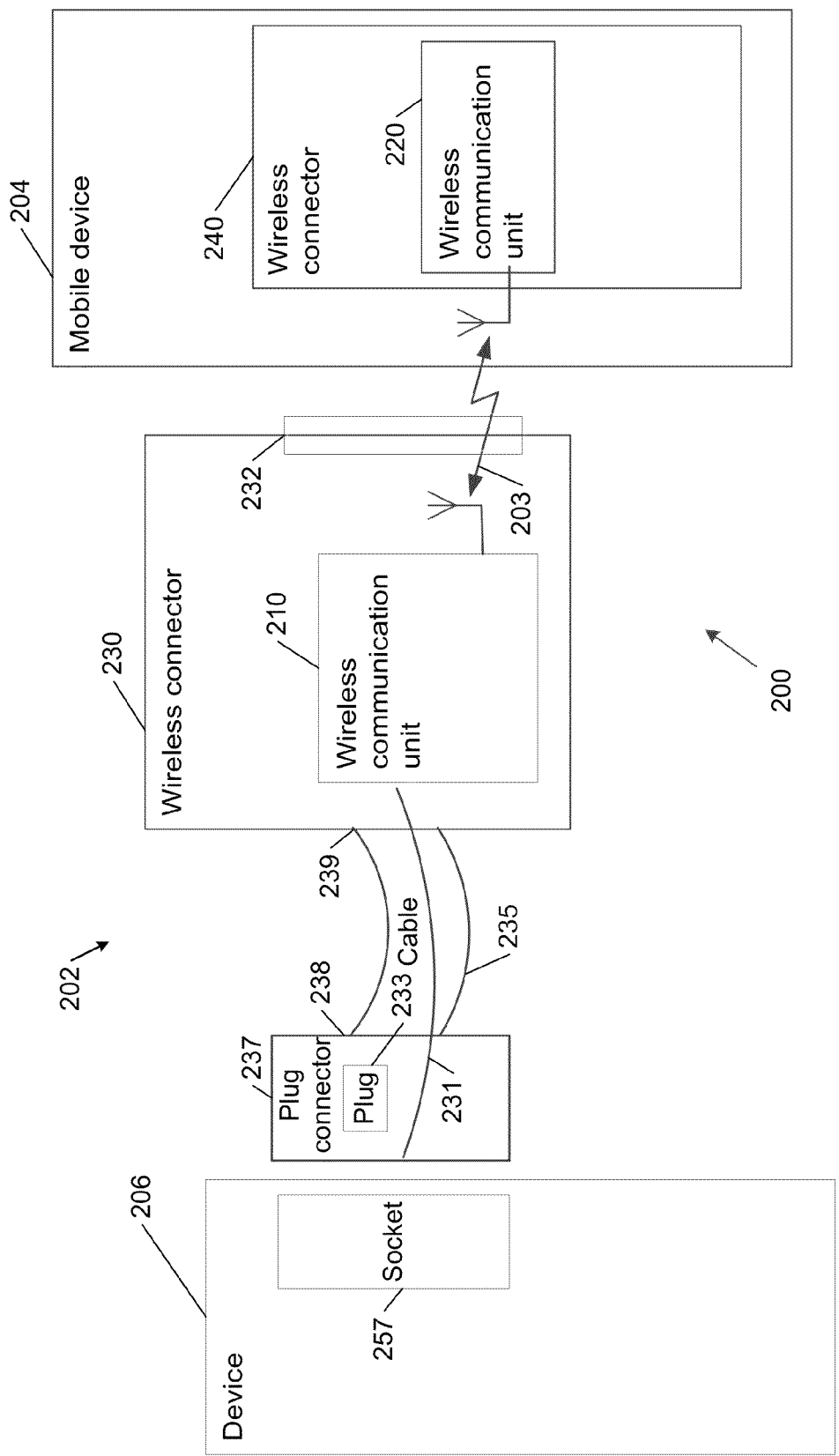
FIG. 2 is a schematic illustration of a wireless connector scheme utilizing a connector cable for connecting between a mobile device and another device, in accordance with some demonstrative embodiments.

Reference is now made to FIG. 2, which schematically illustrates a wireless connector scheme utilizing a connector cable 202 to connect between a first device 204 and a second device 206, in accordance with some demonstrative embodiments.

In some demonstrative embodiments, connector cable 202 may perform the functionality of device 102 (FIG. 1).

In some demonstrative embodiments, device 204 may include a mobile device. For example, device 204 may perform the functionality of device 104 (FIG. 1).

In some demonstrative embodiments, device 206 may include a mobile device or a non-mobile device. For example, device 206 may include, a PC, a desktop computer, a mobile computer, a laptop computer, a storage device, a notebook computer, a tablet computer, a server computer, a handheld computer, a handheld device, a PDA device, a handheld PDA device, an on-board device, an off-board device, a hybrid device, a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a CSLL device, an UMD, an UMPC, an MID, an "Origami" device or computing device, a device that supports DCC, a context-aware device, a video device, an audio device, an A/V device, a Set-Top-Box (STB), a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a music player, or the like.

In some demonstrative embodiments, connector cable 202 may be configured to transfer data between devices 206 and 204. For example, connector cable 202 may be utilized to transfer data, e.g., photos, data and/or other files and/or information, from a Smartphone to a desktop computer and/or the like.

In some demonstrative embodiments, connector cable 202 may include a cable 235, a wireless connector 230 connected to a first end 239 of cable 235 and a plug connector 237 connected to a second end 238 of cable 235.

In some demonstrative embodiments, wireless connector 230 may be configured to be coupled to device 204 and to communicate the data with a wireless connector 240 of device 204 over a wireless communication link 203.

In some demonstrative embodiments, wireless connectors 230 and/or 240 may perform the functionality of wireless connectors 130 and/or 140 (FIG. 1), and wireless communication link 203 may perform the functionality of wireless communication link 103 (FIG. 1).

In some demonstrative embodiments, wireless connectors 230 and 240 may include wireless communication units 210 and 220 to communicate the data over wireless communication link 203. For example, wireless communication units 210 and/or 220 may perform the functionality of wireless communication units 110 and/or 120 (FIG. 1).

In some demonstrative embodiments, wireless connectors 230 and/or 240 may be formed on dedicated ICs. For example, wireless connector 230 may be formed on an IC housed within the first end of cable 235, and wireless connector 240 may be formed on an IC housed within mobile device 204.

In some demonstrative embodiments, wireless connector 230 may include a coupling surface 232 to couple connector cable 202 to device 204 and to maintain wireless communication unit 210 in close proximity to wireless communication unit 220.

In some demonstrative embodiments, connector cable 202 may be configured to communicate the data with device 206 via cable 235.

In some demonstrative embodiments, plug connector 237 may be configured to be connected to device 206, e.g., to communicate the data to device 206.

In some demonstrative embodiments, plug connector 237 may include any suitable mechanical plug 233, e.g., a USB plug, a MiniUSB plug, a DisplayPort plug, and the like, to be connected to a corresponding socket 257 in device 206, e.g., a USB port, a MiniUSB port, and the like.

Alternatively, plug connector 237 may include a wireless connector, e.g., similar to wireless connector 230 described above, to be connected to a corresponding wireless connector of device 206, e.g., a connector similar to wireless connector 240.

In some demonstrative embodiments, connector cable 202 may be configured to provide power from device 206 to wireless communication unit 210. For example, connector cable may include a power cable 231 configured to transfer power through cable 235 from socket 257 to wireless communication unit 210.

In some demonstrative embodiments, wireless communication link 203 may include a short-range wireless communication link having high throughput, e.g., as described above.

In some embodiments, wireless communication units 210 and/or 220 may be configured to establish wireless communication link 203 having a very limited range, so as not to persist for more than a few cm around a coupling point between cable connector 202 and device 204, e.g., to avoid interference to surrounding wireless communication devices.

In some demonstrative embodiments, wireless communication link 203 may be configured to overcome an outer shield of cable connector 202, and/or casing, outer shield and/or an external case of device 204.

In some demonstrative embodiments, the wireless connector scheme described above may provide the zero-force plug/unplug. The zero-force plug/unplug may enhance user experience in the mundane task of connecting mobile device 204 to cable 235 and/or to device 206.

In some demonstrative embodiments, wireless connectors 230 and/or 240 may allow for cleaner industrial design lines in both cable connector 202 and device 204, allowing for Industrial-Design innovation, e.g., "connector-less" design.

In some demonstrative embodiments, wireless connectors 230 and/or 240 may use magnetic coupling to attach connector cable 202 to device 204. For example, cable connector 202 and/or device 204 may include one or more magnetic elements, e.g., as described above with reference to FIG. 1. The magnetic coupling may provide sufficiently strong coupling, e.g., to withstand a normal device manipulation, while enabling quick disengagement of cable connector 202, e.g., in case of strong, immediate pull, thus, reducing the risk of damage to device 204 or a person in case of accidental yank of cable connector 202, for example, if the person accidently trips over cable connector 202.

Additionally or alternatively, wireless connectors 230 and/or 240 may eliminate the need of a cavity or socket in device 204 and/or cable connector 202, which may attract dirt, moisture or become clogged by foreign objects.

In some demonstrative embodiments, wireless connectors 230 and/or 240 may yield higher security and better robustness in dense environments, e.g., compared to conventional WPAN wireless solutions, while still delivering the performance of a cabled solution.

Figure 3:
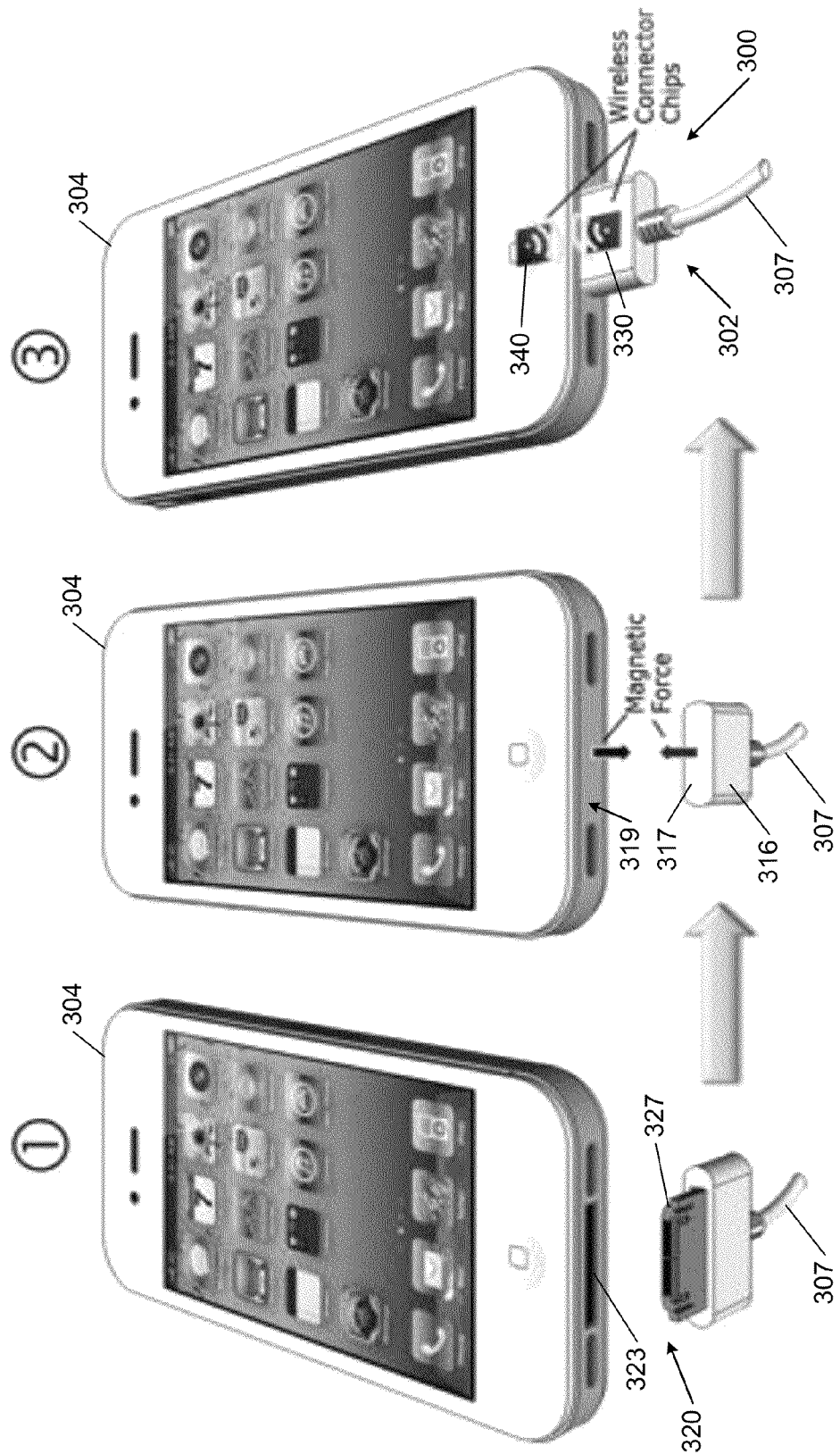
FIG. 3 is a conceptual illustration of a wireless connector scheme for connecting between a Smartphone and a wireless connector cable, in accordance with some demonstrative embodiments.

Reference is now made to FIG. 3, which conceptually illustrates a wireless connector scheme 300 for connecting between a mobile device 304 and a connector cable 302, in accordance to some demonstrative embodiments, in comparison with a conventional mechanical connector scheme 320.

In some demonstrative embodiments, mobile device 304 may include a Smartphone.

Although the conceptual illustration of FIG. 3 depicts a wireless connector scheme for connecting a Smartphone to a cable, in other embodiments the wireless connector scheme may be utilized for connecting any mobile device to any other device.

As shown in the portion of FIG. 3 denoted "1", according to the conventional mechanical connector scheme 320, mobile device 304 includes a large 30-pin socket 323, and a cable 307 is connected to a mechanical plug 327 configured to mate with socket 323.

As shown in the portion of FIG. 3 denoted "2", mechanical plug 327 is omitted from an end 316 of cable 307, and replaced by a clean surface 317 on end 316. Correspondingly, socket 323 is omitted from mobile device 304 as well, which may allow for a cleaner industrial design of an outer surface 319 of device 304. Cable end 316 of cable 307 may be attached to device 302 using magnetic force, e.g. by embedding magnets at the corresponding locations within device 304 and/or end 316 of cable 307, or by any other suitable coupling element and/or mechanism.

As shown in the portion of FIG. 3 denoted "3", the internals of wireless connector scheme 300 are exposed, revealing dedicated wireless connectors, e.g., a first wireless connector 340 within device 304, and a second wireless connector 330 within cable connector 302. For example, wireless connector 330 may perform the functionality of wireless connector 230 (FIG. 2) and wireless connector 340 may perform the functionality of wireless connector 240 (FIG. 2).

In some demonstrative embodiments, wireless connectors 330 and 340 may be formed on dedicated ICs. For example, wireless connector 330 may be formed on an IC housed within end 316 of cable 307, and wireless connector 340 may be formed on an IC housed within mobile device 304.

In some demonstrative embodiments, wireless connectors 330 and 340 may establish a short-range wireless communication link having high throughput. The wireless communication link may utilize a suitable wireless technology, for example, WiGig, which may be able to provide high bit rates at very short distance. For example, the wireless communication link may perform the functionality of wireless communication link 203 (FIG. 2).

In some demonstrative embodiments, the wireless communication link may be designed to overcome a shield/casing of device 304 or even an external case of device 304.

In some demonstrative embodiments, wireless connector scheme 300 may provide the zero-force plug/unplug user experience, e.g., as described above.

In some demonstrative embodiments, cable 307 may be configured to enable another device connected to another end of cable 306, for example, by USB port, to supply power through cable 307 to the IC housed within end 316.

Figure 4:
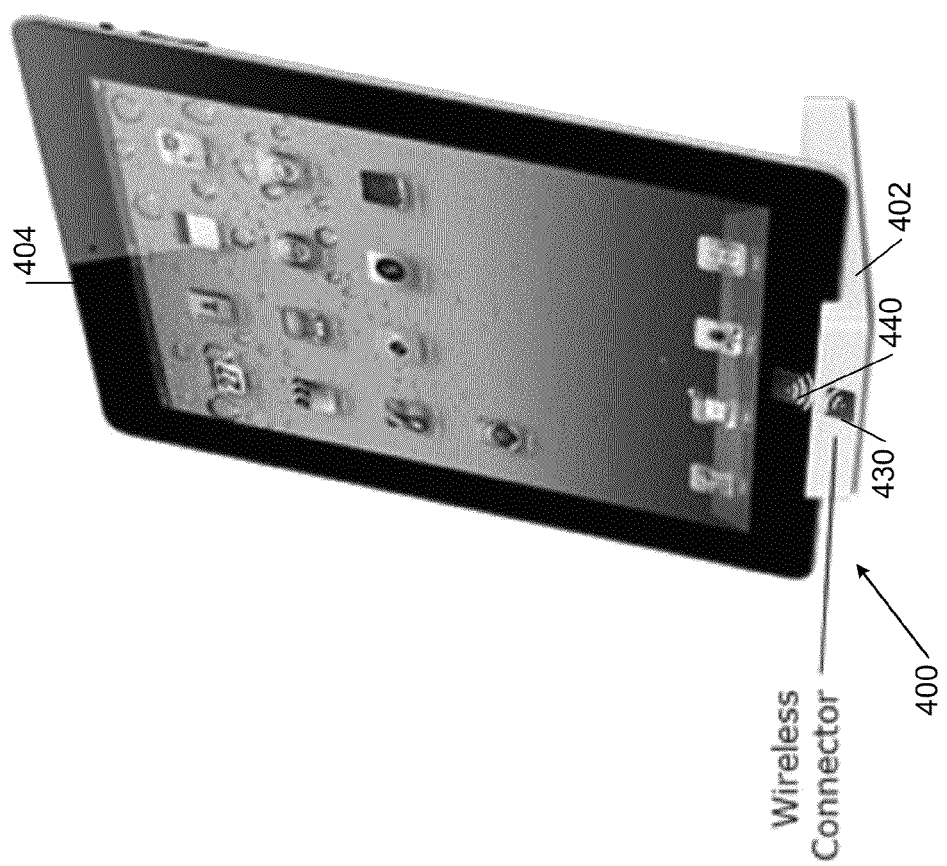
FIG. 4 is a conceptual illustration of a wireless connector scheme for connecting between a mobile device and a cradle for the mobile device, in accordance with some demonstrative embodiments.

Reference is now made to FIG. 4, which conceptually illustrates a wireless connector scheme 400 between a mobile device 404 and a cradle 402 of mobile device 404, in accordance with some demonstrative embodiments. For example, cradle 402 may perform the functionality of device 102 (FIG. 1), and/or device 404 may perform the functionality of device 104 (FIG. 1).

In some demonstrative embodiments, mobile device 404 may include, for example, a tablet computer, a Smartphone and the like, and/or cradle 402 may include a cradle for the tablet, a cradle for the Smartphone, and the like.

As shown in FIG. 4, cradle 402 may utilize a wireless connector 430 to establish a wireless communication link with a wireless connector 440 of device 404. For example, wireless connectors 430 and/or 440 may perform the functionality of wireless connectors 130 and/or 140 (FIG. 1).

Cradle 402 may utilize wireless connector 430, for example, to replace the conventional mechanical connector that is usually used for such implementations.

In some demonstrative embodiments, wireless connector 430 may include a plug-less wireless connector, e.g., as described above.

In some demonstrative embodiments, wireless connector 430 may be configured to be coupled to wireless connector 440 of device 404. Wireless connector 430 may be configured to communicate data with device 404, e.g., when device 404 is placed in cradle 402.

In some demonstrative embodiments, wireless connector 430 may include a wireless communication unit to communicate the data over a wireless communication link between the wireless communication unit and another wireless communication unit of device 404, e.g., between wireless communication units 110 (FIG. 1) and/or 120 (FIG. 1), as described above.

As shown in FIG. 4, wireless connectors 430 and/or 440 may allow having a "cleaner" Industrial design (ID) of device 404 and cradle 402, e.g., a "connectionless design", and less risk of damage to mobile device 404 due to improper plugging.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a cable; and
    a wireless connector connected to an end of said cable, said wireless connector configured to be coupled to a device to communicate data with said device, the wireless connector including a wireless communication unit to communicate said data over a short-range wireless communication link at a multi-gigabit-per second (MGbs) rate.

2. The apparatus of claim 1, wherein said wireless connector is to be physically coupled to said device.

3. The apparatus of claim 2, wherein said wireless connector comprises a magnetic element to couple said wireless connector to said device by magnetic force.

4. The apparatus of claim 1, wherein said wireless connector comprises a plug-less connector.

5. The apparatus of claim 1, wherein said wireless communication link comprises a Wireless-Gigabit (WiGig) link.

6. The apparatus of claim 5, wherein said wireless communication unit is to communicate said data over at least one link selected from the group consisting of a WiGig Serial Extension (WSE) link, a WiGig Display Extension (WDE) link, a WiGig Bus Extension (WBE) link, and a WiGig Secure Digital extension (WSD) link.

7. The apparatus of claim 1, wherein said short-range wireless communication link has a range of no more than five centimeters.

8. The apparatus of claim 1 comprising a plug connector connected to another end of said cable, said plug connector configured to be connected to another device.

9. The apparatus of claim 8, wherein said wireless connector is to transfer the data between said device and said cable, said cable is to transfer said data between said wireless connector and said plug connector, and said plug connector is to transfer the data between the cable and the another device.

10. A connector cable to transfer data between first and second devices, the connector cable comprising:
    a cable; and
    a wireless connector connected to an end of said cable to communicate said data with said first device via said cable, wherein the wireless connector is to be coupled to said second device and to communicate said data with said second device over a wireless communication link.

11. The connector cable of claim 10, wherein said wireless connector is connected to a first end of said cable, the connector cable further comprising a plug connector, connected to a second end of said cable, to be connected to said first device.

12. The connector cable of claim 10, wherein said wireless connector comprises a wireless communication unit to communicate said data over said wireless communication link.

13. The connector cable of claim 12, wherein said cable is to provide power from said first device to said wireless communication unit.

14. The connector cable of claim 12, wherein said wireless communication link comprises a Wireless-Gigabit (WiGig) link.

15. The connector cable of claim 14, wherein said wireless connector is to communicate said data over at least one link selected from the group consisting of a WiGig Serial Extension (WSE) link, a WiGig Display Extension (WDE) link, a WiGig Bus Extension (WBE) link, and a WiGig Secure Digital extension (WSD) link.

16. The connector cable of claim 10, wherein said wireless connector is to be physically coupled to said second device.

17. The connector cable of claim 16, wherein said wireless connector comprises a magnetic element to couple said wireless connector to said second device by magnetic force.

18. The connector cable of claim 10, wherein said wireless connector comprises a plug-less connector.

19. The connector cable of claim 10, wherein said wireless communication link comprises a short-range multi-gigabit-per second (MGbs) link.

20. The connector cable of claim 19, wherein said short-range wireless communication link has a range of no more than five centimeters.

* * * * *